R. J. MANLEY.
LOCK FOR SHIFT LEVERS.
APPLICATION FILED AUG. 18, 1919.
1,338,945.
Patented May 4, 1920.
2 SHEETS—SHEET 1.
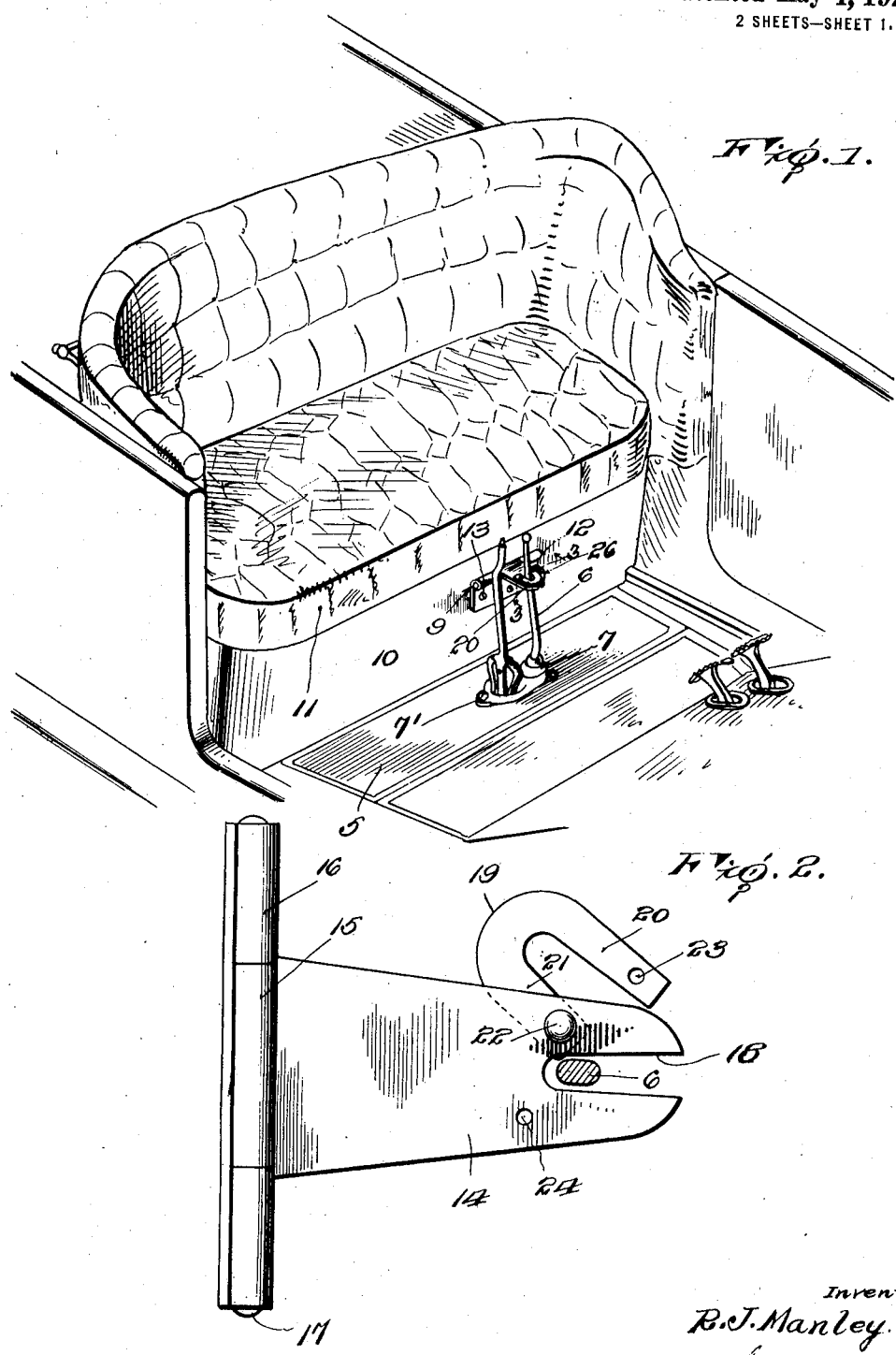
Inventor:
R. J. Manley.
by Lacey & Lacey,
Attorneys.

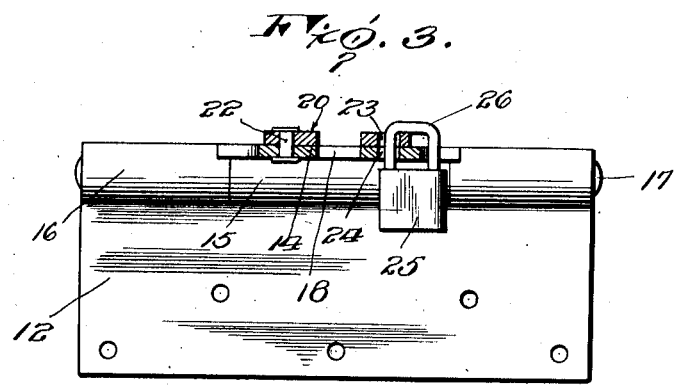
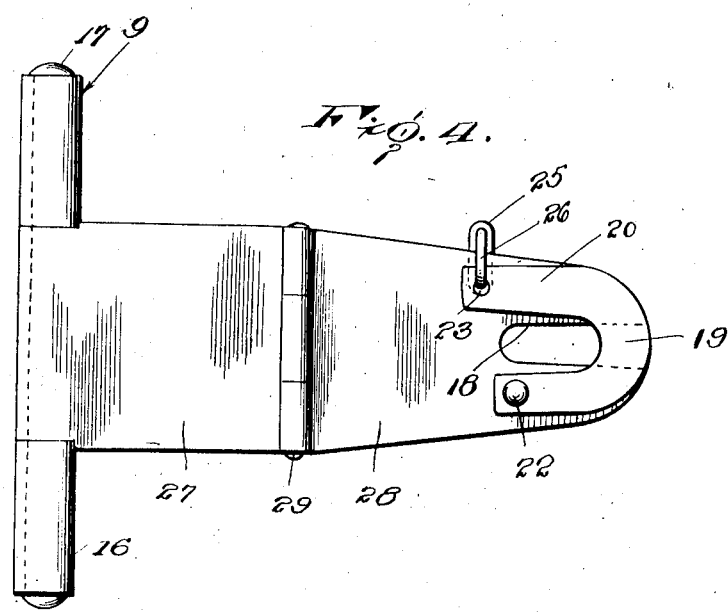
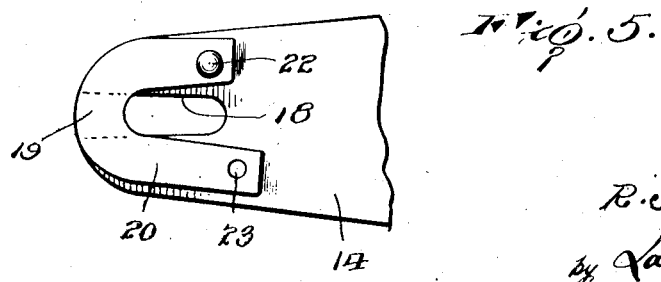

UNITED STATES PATENT OFFICE.

RALPH J. MANLEY, OF IOWA CITY, IOWA.

LOCK FOR SHIFT-LEVERS.

1,338,945.  Specification of Letters Patent.  Patented May 4, 1920.

Application filed August 18, 1919. Serial No. 318,333.

*To all whom it may concern:*

Be it known that I, RALPH J. MANLEY, a citizen of the United States, residing at Iowa City, in the county of Johnson and State of Iowa, have invented certain new and useful Improvements in Locks for Shift-Levers, of which the following is a specification.

My invention relates to improvements in lever locks especially adapted for locking the gear shift levers of automobiles while not necessarily restricted to such use.

An important object of this invention is to provide a lock of the class described having novel means for locking the gear shift lever of an automobile against movement by unauthorized persons.

A further object of the invention is to provide a lock of the class described which may be conveniently and inconspicuously applied to an automobile and which may be readily and conveniently operated.

A further object of the invention is to provide a device of the class described which is simple, durable, and cheap to manufacture.

Other objects and advantages of the invention will be apparent during the course of the following description.

In the accompanying drawing forming a part of this application and in which like numerals are employed to designate like parts throughout the same, Figure 1 is a perspective view of the device applied.

Fig. 2 is a bottom plan view of the same open,

Fig. 3 is a transverse section taken on line 3—3 of Fig. 1,

Fig. 4 is a plan view of a slightly modified form of the invention, and

Fig. 5 is a fragmentary plan view of the device.

In the drawing wherein for the purpose of illustration is shown a preferred embodiment of my invention, the numeral 5 designates the floor board of a vehicle through which extends the usual gear shift lever 6. A cover plate 7 surrounds the lever and is secured to the floor by screws 7' as is usual.

A lock 9 is secured to the front side 10 of a seat 11 and is adapted to engage the lever and lock the same, preferably when in a neutral position. The lock 9 includes a rectangular attaching plate 12 secured to the front side 10 by suitable fastening devices 13, such as screws. A locking arm 14 is provided at its rear end portion with a hinge barrel 15 which is alined with the hinge barrels 16 formed along the lower edge of the attaching plate 12 and receiving a pivot pin 17. As is obvious, the arm 14 is horizontally pivoted and is provided with a longitudinally extending opening or slot 18 which opens out through its forward end and is adapted to receive the lever 6. A U-shaped shackle 19 is provided with long and short arms 20 and 21, the latter being pivoted to the forward portion of the arm 14 by a pin 22. As best illustrated in Fig. 5, the long arm 20 of the shackle 19 extends rearwardly of the opening 18 and to one side of the same and is provided with an opening 23 adapted and is provided with an opening 23 adapted to aline with an opening 24 in the adjacent portion of the arm 14. A padlock 25 of a suitable type is adapted to have its shackle 26 extended through the openings 23 and 24 for locking the shackle 19 in the position illustrated in Fig. 1.

In extending the arm 20 rearwardly of the opening 18 and providing padlock engaging means at a point spaced some distance to the rear of the gear shift lever, the padlock may be readily unlocked without interference by the lever 6.

As particularly illustrated in Figs. 4 and 5, the arms 20 and 21 of the U-shaped shackle are joined by a curved connecting portion which has its forward edge arranged flush with the curved forward end of the locking arm. By this construction the clothes of the operator of the vehicle are prevented to a high degree from becoming entangled in the lock and particularly the projections formed by the longitudinal slot 18. It will be noted also that the long and short arms of the U-shaped shackle have their outer edges arranged inwardly of the side edges of the locking arm.

In the form of my invention illustrated in Fig. 4, I have formed the locking arm 14 into sections 27 and 28 which are hingedly connected as indicated at 29. The forward section 28 may be folded upon the section 27 and thereby caused to occupy a minimum of space when not in use. When it is desired to lock the gear shift lever against movement, the arm 14 is swung to an approximately horizontal position and is engaged with the lever as illustrated in Fig. 1. The shackle 19 is now swung on its pivot to lock the lever 6 within the opening or slot 18, and a padlock is subsequently engaged with the long arm of the shackle and the adjacent portion of the hinged arm whereby the lever is locked against movement.

While I have shown and described the preferred embodiment of my invention, it is understood that such minor changes in arrangement and construction of parts may be made as will remain within the spirit of the invention and the scope of what is claimed.

Having thus described my invention, what I claim is:

A lock for automobile levers including an attaching plate, an elongated locking arm formed from flat metal horizontally pivoted to said plate and having a longitudinal lever receiving slot extending out through its forward end and spaced from the sides of the same, a U-shaped shackle having long and short arms adapted to be arranged on opposite sides of said longitudinal slot and inwardly of the side edges of said locking arm, said long and short arms being joined by a curved connecting portion adapted to be extended across the forward end of said slot with one edge flush with the forward end of the locking arm, a pivot element connecting one end of said short arm to said locking arm at one side of said longitudinal slot, the free end portion of the long arm of the shackle and the adjacent portion of said locking arm being provided with alined openings rearwardly of said lever receiving slot whereby a lock may be readily extended through said alined openings for locking the free end portion of the long arm of the shackle to the locking arm at a point spaced rearwardly of a lever when arranged in said slot.

In testimony whereof I affix my signature.

RALPH J. MANLEY. [L. S.]